United States Patent
Ozawa et al.

(10) Patent No.: US 6,791,224 B1
(45) Date of Patent: Sep. 14, 2004

(54) STATOR WINDING AND MANUFACTURING METHOD THEREFOR

(75) Inventors: Masaru Ozawa, Wako (JP); Takeo Fukuda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 221 days.

(21) Appl. No.: 09/619,547

(22) Filed: Jul. 19, 2000

(30) Foreign Application Priority Data

Jul. 26, 1999 (JP) .......................................... 11-211395

(51) Int. Cl.[7] .............................. H02K 3/04; H02K 3/28
(52) U.S. Cl. ...................... 310/179; 310/203; 310/208; 29/596
(58) Field of Search ................................ 310/179, 203, 310/206, 207, 208; 29/596

(56) References Cited

U.S. PATENT DOCUMENTS

| | | | |
|---|---|---|---|
| 3,777,197 A | | 12/1973 | Preston et al. |
| 3,995,364 A | * | 12/1976 | Kristiansen ................. 29/598 |
| 4,099,077 A | * | 7/1978 | Maekawa .................... 310/237 |
| 4,260,924 A | | 4/1981 | Lugosi et al. |
| 4,481,438 A | * | 11/1984 | Keim .......................... 310/201 |
| 5,197,180 A | * | 3/1993 | Mihalko ...................... 29/596 |
| 5,425,165 A | * | 6/1995 | Shramo et al. .............. 29/596 |
| 5,955,810 A | * | 9/1999 | Umeda et al. ............... 310/208 |
| 6,049,966 A | * | 4/2000 | Kawano et al. .............. 29/596 |

FOREIGN PATENT DOCUMENTS

| | | | |
|---|---|---|---|
| DE | 25 11 567 | 9/1976 | |
| EP | 0 150 070 | 7/1986 | |
| EP | 0 251 029 | 1/1988 | |
| GB | 1 242 421 | 8/1971 | |
| JP | 51 025758 | 3/1976 | |
| WO | WO 90/10336 A1 | * 9/1990 | ............ H02K/3/14 |

OTHER PUBLICATIONS

T. Kenjo and S. Nagamori, Permanent-Magnet and Brushless DC Motors, 1985, Clarendon Press Oxford, p. 47.*

* cited by examiner

Primary Examiner—Thanh Lam
Assistant Examiner—David W. Scheuermann
(74) Attorney, Agent, or Firm—Carrier, Blackman & Associates, P.C.; Joseph P. Carrier; William D. Blackman (57) ABSTRACT

A stator winding which copes with high output and miniaturization turns formed by winding a wire sheaf of a plurality of fine wires bundled together, in an approximately rhombic shape, wherein the turns are arranged so as to be sequentially shifted in the direction of one diagonal of the rhombic shape, to thereby form an approximately rhombic shape coil segment comprising a continuous length of the wire sheaf. A plurality of coil segments are then sequentially shifted and overlapped on one diagonal to form a band shaped body, and a hollow cylindrical body is then formed by rolling the band shaped body into a circular shape. The winding is characterized in that with each turn, opposite end portions located in the direction of an other diagonal orthogonal to the direction of the one diagonal have U-shape bent back portions.

19 Claims, 10 Drawing Sheets

STATOR WINDING AND MANUFACTURING METHOD THEREFOR

BACKGROUND OF THE INVENTION

1. Field of the Invention

The present invention relates to a stator winding which is suitable for use in a rotating electrical machine such as an electric motor or generator, and more specifically which is suitable for use in a slotless stator of a high speed rotating electrical machine, and to a manufacturing method therefor.

This application is based on Japanese Patent Application No. Hei 11-211395, the contents of which are incorporated herein by reference.

2. Description of the Related Art

Heretofore, there has been proposed a slotless stator where, from the viewpoint of making even the magnetic resistance of the main magnetic flux path as viewed from the stator side, a slot is not formed. A radial gap type slotless construction where cylindrical windings are secured to an inner peripheral side of a slotless stator which faces a rotor, is widely used.

Such a radial gap type slotless construction is disclosed in the specification of U.S. Pat. No. 5,313,131.

Figure 13:
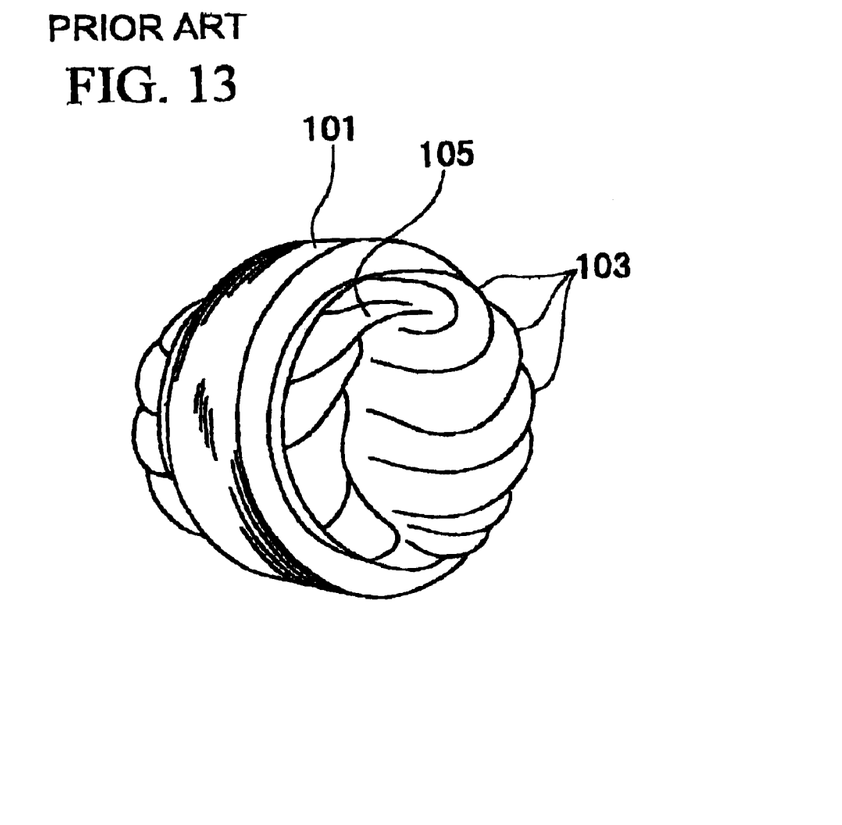
FIG. 13 is a perspective view showing a slotless stator according to conventional technology.
Figure 14:
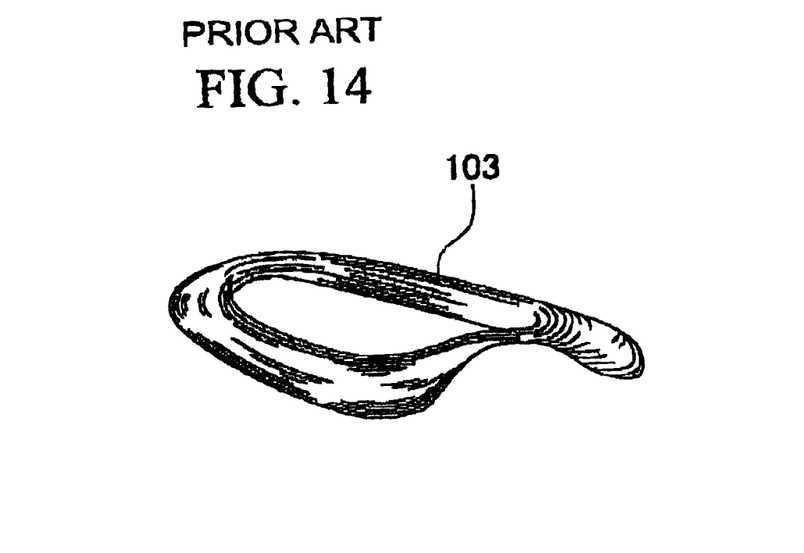
FIG. 14 is a perspective view showing a coil segment used in the slotless stator of FIG. 13.

FIG. 13 is a perspective view showing an end portion of a slotless stator. A plurality of coil segments 103 are secured to an inner peripheral face of a stator core 101. These coil segments 103, as shown in FIG. 14, bear an approximate quadrilateral shape with rounded corners. When these coil segments 103 are used, this gives a construction, as can be seen from FIG. 13, where one side 105 of the quadrilateral shape is exposed from the edge portion of the stator core 101.

If one side of the coil segment is exposed, then the amount of the winding for that part is wastefully used. This increases the resistance value of the windings and produces heat. In the case where this is used in a high speed electric motor with the speed reaching for example several tens of thousand rpm, such heat cannot be disregarded.

Furthermore, if the number of turns of the coil is increased, then the amount exposed from the stator increases accordingly. Moreover, the less the number of poles the longer the span length exposed from the stator end. Furthermore, in coping with a high output brings the requirement for arranging conductors compatible with high currents. In such a case, the size of the coil in the axial direction or in the diametral direction is increased, so that the rotating electrical machine itself is enlarged. That is to say, there is the problem that when the conductor amount is increased to realize the high output, the rotating electrical machine is enlarged.

In particular, in the case where the stator coil is enlarged in the axial direction, then corresponding to this the rotor is also enlarged in the axial direction. This has a significant influence on the centrifugal strength and shaft vibration of the rotor. Consequently, there is a strong demand for miniaturizing the stator coil as much as possible particularly in the axial direction.

As another shape for the abovementioned approximate quadrilateral shape coil segment, there is proposed in Japanese Patent Application, Second Publication No. Sho 53-44362 a coil having rhombic shaped turns.

Figure 15:
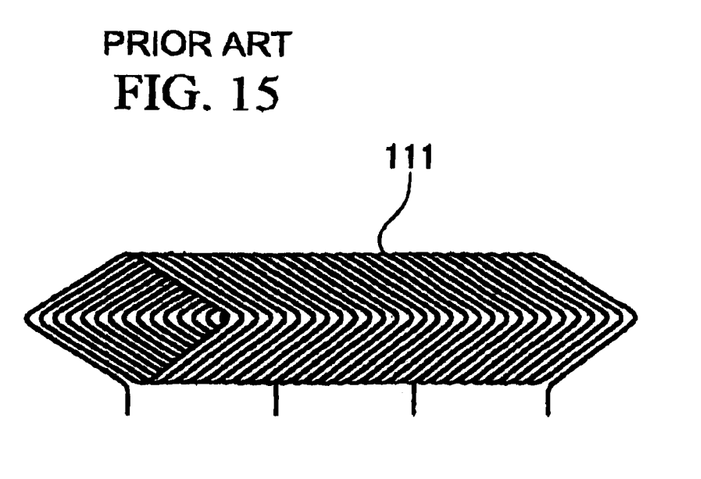
FIG. 15 is a plan view showing a band shaped coil having rhombic shaped turns according to conventional technology.
Figure 16:
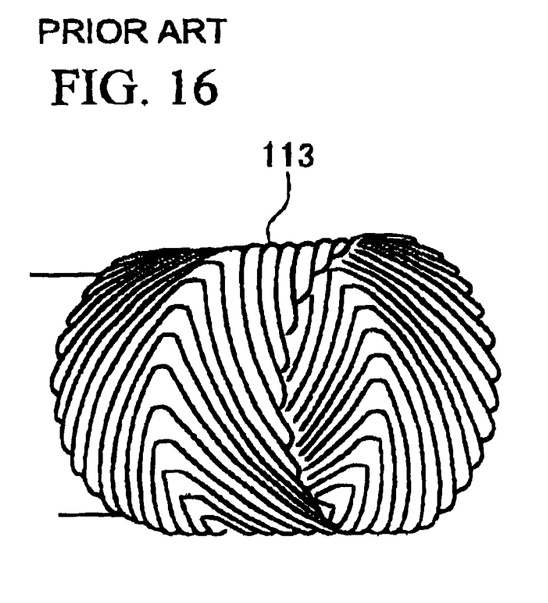
FIG. 16 is a perspective view showing a cylindrical coil formed by rolling the band shaped coil of FIG. 15.

FIG. 15 shows a band shape coil 111 formed by sequentially aligning rhombic shaped turns. FIG. 16 shows a cylindrical shaped coil 113 formed by rolling the band shaped coiled 111 of FIG. 15. With such a cylindrical shaped 113, since apexes of the rhombic shapes are located at opposite ends of the cylindrical body, the amount of windings exposed from the stator can be kept to a minimum.

With the form of FIG. 15 however, the band shaped coil comprising rhombic shaped turns is formed from single wires, and is not possible to make this a multi-layered cylindrical coil which is a necessity in order to obtain a high output. In this case also, even if this is parallel connected, phase matching is difficult, and there is the problem that if these are laminated in several layers, the coil thickness increases.

SUMMARY OF THE INVENTION

Accordingly, the present invention takes into consideration the above problems with the object of providing a slotless stator which addresses the realization of high output and also miniaturization. Moreover, it is an object to provide a method of manufacturing a stator winding which is simple and has good formability.

The above objects are achieved by the following means.

The stator winding of the present invention is characterized in being a hollow cylindrical body formed by: forming turns by winding a wire sheaf of a plurality of fine wires composed of conductors bundled together, through one turn in an approximately rhombic shaped forming approximately rhombic shape coil segments comprising a continuous length of the wire sheaves by winding and arranging a plurality of the turns so as to be sequentially shifted continuously in a direction of one diagonal of the rhombic shaped, forming a band shape body using a plurality of the coil segments with these coil segments sequentially shifted in the direction of the one diagonal and so as to be adjacent to each other, and rolling the band shape body into a cylindrical shape.

Since the coil segments are each formed from a single wire sheaf comprising a plurality of fine wires, then compared to a coil segment formed a single wire, this can be made to cope with higher speed rotation. Moreover, with the wire sheaf, by pressing this using a press, an increase in the thickness of the coil can be avoided, and by twisting together, circulating current losses are reduced.

The wire sheaf is characterized in that one end portion of opposite end portions of the respective turns which are located in the direction of an other diagonal orthogonal to the direction of the one diagonal is wound from an inner peripheral side of the hollow cylindrical body to an outer peripheral side thereof, and the other end portion of the opposite end portions of the respective turns, is wound from the outer peripheral side of the hollow cylindrical body to the inner peripheral side thereof.

The respective turns are characterized in that opposite end portions thereof which are located in the direction of an other diagonal orthogonal to the direction of the one diagonal, have bent back portions which proceed so as to project to an outside of the turn, and then return back in an approximate U-shape and proceed so as to return to an inside.

By locating the bent back portions on the end portions of the hollow cylindrical body, these bent back portion face in the direction of the other diagonal of the rhombic shape, that is to say in the longitudinal (axis) direction of the hollow cylindrical body. As a result, the bent back portions can be compactly arranged around the circumferential direction of the hollow cylindrical body, so that a plurality of turns can be closely wound. Consequently, even if the number of turns is increased, the bent back portions are laminated side by side, and these bent back portions are not exposed extending in the radial direction or the axial direction of the cylindrical body.

When the windings according to the present invention are secured to the core of the slotless stator, only the bent back portions of the respective turns are exposed from the end of the stator. That is to say, the portion exposed from the core is only the bent back portions and is only a little, Hence the winding amount is considerably reduced of the entire windings.

Preferably the respective turns are arranged in a condition touching adjacent turns. In this way, a winding wound at a high density can be formed.

More preferably, of the four sides of the approximately rhombic shaped coil segments, two sides located on one side of the other diagonal are arranged on an inner peripheral side of the hollow cylindrical body, and the other two sides opposite to the two sides located on the one side are arranged on an outer peripheral side of the hollow cylindrical body.

Since two sides of the coil segment are arranged on the inner peripheral side of the hollow cylindrical body, and the other two sides are arranged on the outer peripheral side thereof, then on both the inner peripheral side and the outer peripheral side, the wire sheaves are closely arranged.

Even more preferably, the two sides of the coil segment which are arranged on the inner peripheral side of the hollow cylindrical body are abutted in the circumferential direction against the two sides which are arranged on the inner peripheral side of the adjacent coil segment, and the respective coil segments are arranged sequentially shifted while being overlapped so as to radially overlap the two sides of the adjacent coil segments, which are arranged on the outer peripheral side of the hollow cylindrical body.

The two side of the respective coil segments which are arranged on the inner peripheral side of the hollow cylindrical body are uniformly arranged in the circumferential direction. Furthermore, the two sides of the respective coil segments which are arranged on the outer peripheral side of the hollow cylindrical body overlap the two sides arranged on the inner peripheral side of the adjacent coil segment, in the radial direction of the hollow cylindrical body. In so doing, the respective coil segments are arranged in an alternately overlapped fashion. As a result, the plurality of coil segments are closely overlapped in the circumferential direction and the diametral direction.

More preferably, with the bent back portions located on the opposite ends of the respective turns, one end side thereof is bent from the inner peripheral side of the hollow cylindrical body towards the outer peripheral side, and/or the other end side is bent from the outer peripheral side towards the inner peripheral side.

Since the bent back portions are bent from the inner peripheral side (outer peripheral side) to the outer peripheral side (inner peripheral side), the bent back portions can be arranged closely in the circumferential direction. As a result, the respective turn sets can be arranged sequentially and in close contact in the circumferential direction. That is to say, even if the number of turns of increased, the winding is not enlarged in the axial direction and the diametral direction.

More preferably, the wire sheaf is twisted at least one turn in a helical form within a range of one side of the respective approximately rhombic shaped turns.

Twisting in a helical shape gives a construction the same as a Litz wire used for example in high frequency transformers. Hence the electromotive voltage difference which is produced in the respective strands in the wire sheaf forming the turns can be reduced, and the generation of unnecessary losses of, for example circulating currents can be suppressed.

More preferably, the wire sheaf has an approximately rectangular shape cross-section.

When wire sheaves having rectangular cross-sections are arranged adjacent to each other, these wire sheaves can be arranged in a close contact condition, thereby increasing the conductor space factor of the coil segment.

More preferably, the fine wires have a distorted circular cross-section with linear portions, and adjacent fine wires are contacted at the linear portions.

In this way, the conductor space factor is further increased.

A method of manufacturing a stator winding according to the present invention, which stator winding may be used in a rotating electric machine having a slotless stator, comprises steps of:

a turn forming step for forming turns by winding a wire sheaf of a plurality of fine wires composed of conductors bundled together, through one turn in an approximately rhombic shape; a coil segment forming step for forming coil segments comprising a continuous length of the wire sheaf by winding and arranging a plurality of the turns so as to be sequentially shifted continuously in the direction of one diagonal of the rhombic shape; and a hollow cylindrical body forming step for forming a band shaped body using a plurality of the coil segments by sequentially shifting and overlapping these coil segments so as to be adjacent in the direction of the one diagonal, and rolling the band shaped body into a hollow cylindrical shape. The turn forming step includes a step where, with the wire sheaf, one end portion of opposite end portions of the respective turns which are located in the direction of an other diagonal orthogonal to the direction of the one diagonal is wound from an inner peripheral side of the hollow cylindrical body to an outer peripheral side thereof, and an other end portion of the opposite end portions of the respective turns, is wound from the outer peripheral side of the hollow cylindrical body to the inner peripheral side thereof.

The turn forming step is characterized in incorporating a bent back portion forming step for forming bent back portions at opposite end portions of the respective turns which are located in the direction of the other diagonal orthogonal to the direction of the one diagonal, each said bent back portion proceeds so as to project to an outside of the turn, and then returns back in an approximate U-shape and proceeds so as to return to an inside of the turns.

Preferably, the turn forming step incorporates a press step for pressing the wire sheaf so that adjacent fine wires are closely contacted together.

By pressing, the respective fine wires constituting the wire sheaf are deformed to a close contact condition. Furthermore, by keeping the respective fine wires in a close contact condition in this way, the cross-sectional shape of the wire sheaf can be stably maintained.

More preferably, prior to the press step there is provided a step for twisting the wire sheaf at least one turn in a helical form within a range of one side of the approximately rhombic shaped turn.

By carry out pressing after applying a twist, the respective fine wires are deformed in a twisted condition, and hence a more rigid close contact condition is obtained.

More preferably, the press step incorporates a step for forming the wire sheaf so that the wire sheaf has an approximately rectangular cross-section.

DESCRIPTION OF THE PREFERRED EMBODIMENTS

Hereunder is a description of embodiments of the present invention with reference to the appended drawings.

Figure 1:
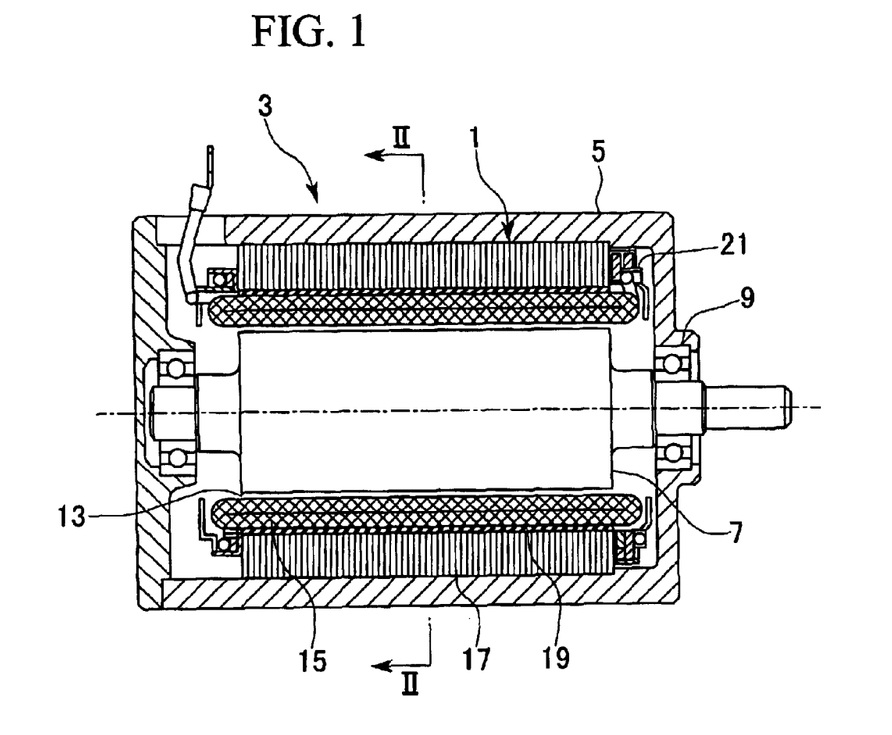
FIG. 1 is a sectional view showing a rotating electric machine provided with a stator winding according to an embodiment of the present invention.

FIG. 1 is a cross-sectional view showing a rotating electrical machine provided with a stator winding being one embodiment of the present invention.

Figure 2:
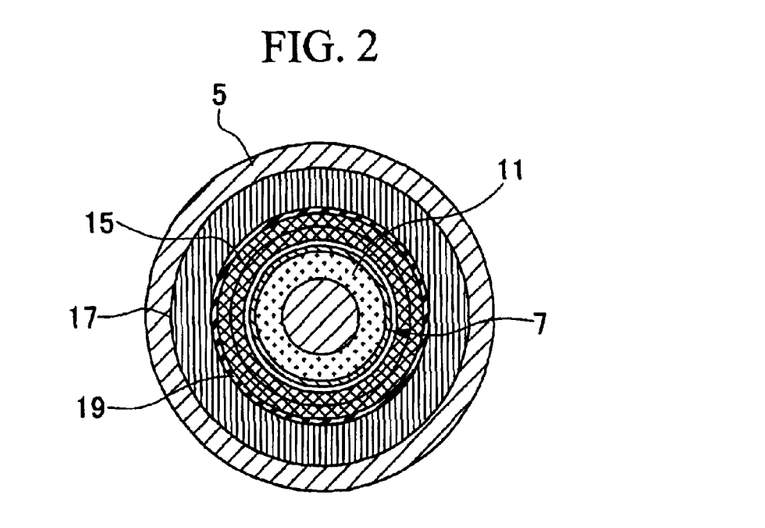
FIG. 2 is a sectional view on the section line II—II of FIG. 1.

FIG. 2 is a sectional view on the section line II—II of FIG. 1.

A rotating electrical machine 3 incorporating a slotless stator 1 is shown in FIG. 1. This is suitable for use in a high speed rotating electrical machine which is used for example at several kW to several tens of kW, and at rotational speeds above several ten thousand rpm.

With the rotating electrical machine 3, the outer shape is formed from a casing 5, and a rotor 7 is rotatably arranged via bearings 9 along a central axis of the casing 5.

With the rotor 7, as shown in FIG. 2, a permanent magnet 11 serving as magnetic field generating device is incorporated therein. This permanent magnet 11 is constructed so that p (where p is an even number of two or more) magnetic poles for generating a magnetic flux in the radial direction, are formed on the outer surface of the rotor 7. For the permanent magnet, a rare earth magnet such as a Sm—Co, Nd—Fe—B sintered magnet is suitable.

The slotless stator 1, as shown in FIG. 1 is arranged around the rotor 7, forming a small gap 13. The slotless stator 1 is one wherein slots for securing windings are not formed. The slotless stator 1 comprises a winding (stator winding, or slotless stator winding) 15 positioned on the rotor 7 side, and a stator core 17 positioned on the casing 5 side.

Figure 11:
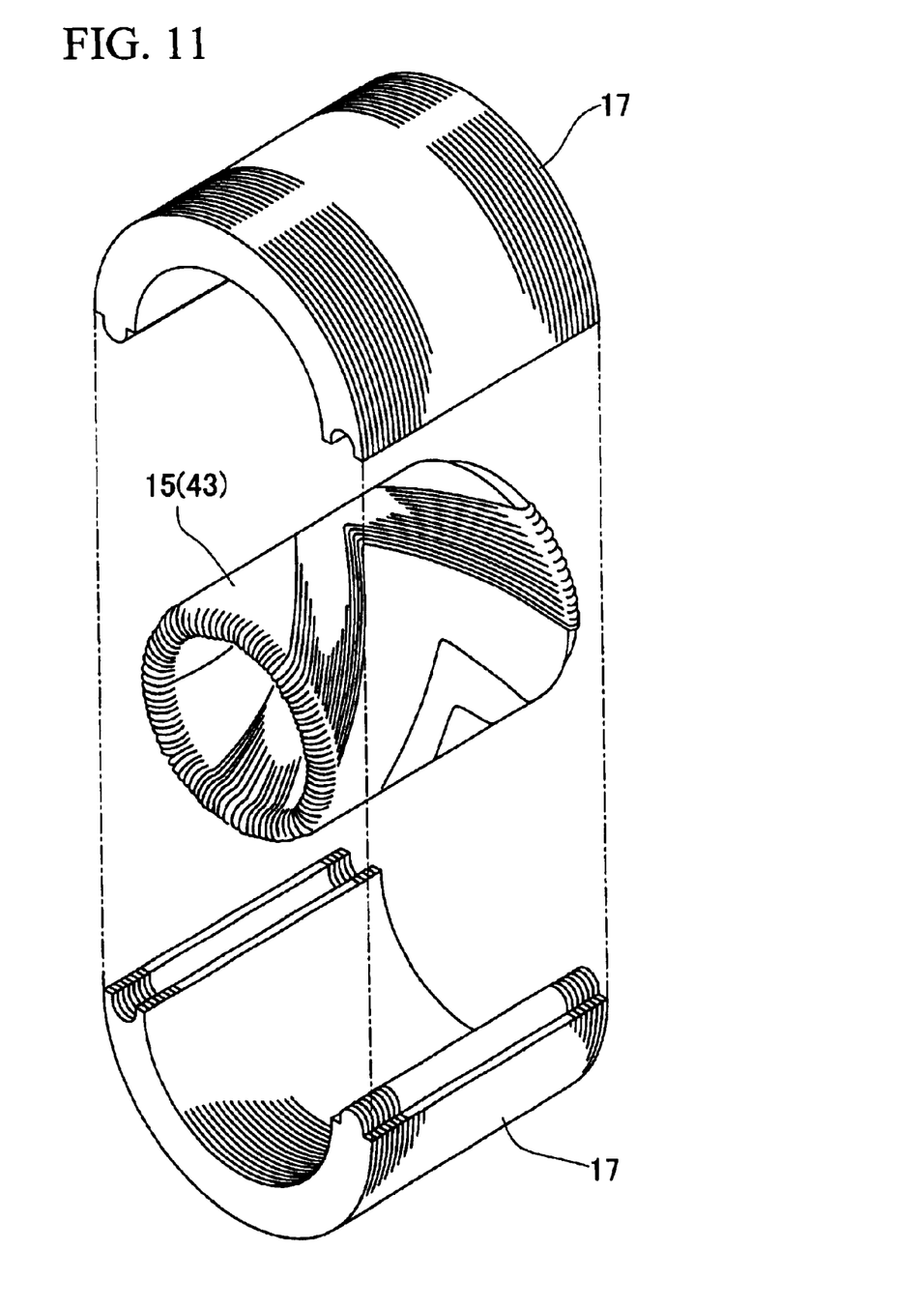
FIG. 11 is a perspective view showing a stator core with a divided construction.

The stator core 17 is in the form of a hollow cylindrical shape, and is secured so that the outer peripheral face of the stator core 17 is contacted with the inner peripheral face of the casing 5. The stator core 17 is constructed by laminating a large number of ring shaped electrical steel plates in the plate thickness direction. The stator core 17 has an inner peripheral face which is a cylindrical surface not formed with slots. Here the stator core 17 may also be a divided configuration. For example, as shown in FIG. 11, this may be in a two piece form. Of course, this may also be three or more pieces.

The winding 15, as with the stator core 17, is a hollow cylindrical shape, and is secured by means of an insulation layer 19 so that the outer peripheral face of the winding 15 faces the inner face peripheral face of the stator core 17. With the winding 15, the end portions are connected by connection wires via a bus bar 21.

Hereunder is a detailed description of the winding 15.

Moreover, by bending from the inner peripheral side of the hollow cylindrical body to the outer peripheral side thereof, the one set of two sides 39 can be arranged on the outer peripheral side, and the other set of two sides 41 can be arranged on the inner peripheral side. Consequently, the wire sheaves 27 can be arranged evenly and close together on both the inner peripheral side and the outer peripheral side of the hollow cylindrical body.

Figure 4:
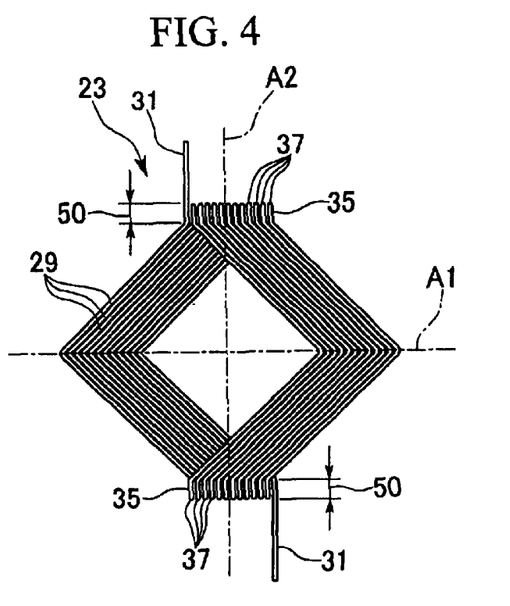
FIG. 4 is a plan view showing a coil segment.

The coil segments 23 are formed from a wire sheaf 27 (refer to FIG. 6) with a plurality of magnetic wires (fine wires) 25 composed of conductors bundled together. The magnetic wires 25 are formed with an insulation layer on the surface, and the strand outer diameter is preferable less than 1 mm. As shown in FIG. 4, the coil segments 23 are constructed by arranging a plurality of single turns 29 formed by winding the wire sheaf 27 once around an approximate rhombic shape. That is to say, the respective turns 29 are wound and arranged so as to be continuously and sequentially shifted in the direction of a diagonal A1 (one diagonal) of a rhombic shape extending in the left and right direction in the figure. The respective turns 29 are arranged contacting with adjacent turns 29 in a close contact condition.

Here instead of the magnetic wire 25, a Litz wire may be used in order to reduce the skin effect at high frequencies.

The turns 29 have the following characteristics for the shape. As is apparent from FIG. 4, opposite end portions 35 which are located in the direction of a diagonal (other diagonal) A2 which extends in the vertical direction in the figure, orthogonal to the direction of the one diagonal A1 have bent back portions 37. These bent back portions 37 are formed proceeding so as to project on the other diagonal A2 towards the outside of the turns 29, and then return back in an approximately U-shape and proceed so as to return on the other diagonal A2 towards the inside of the turns 29. That is to say, the bent back portions 37 in this embodiment are in an approximately 180° bent hair pin shape.

Figure 5:
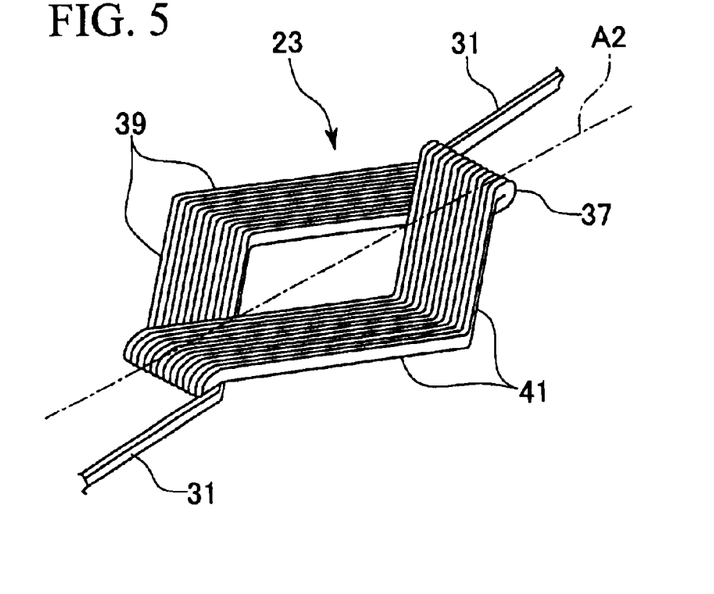
FIG. 5 is a perspective view showing a coil segment.

Furthermore, with the bent back portions 37, as will be apparent from FIG. 5 being a perspective view of the coil segment 23, these are bent from the lower (upper) side in the figure to the upper (lower) side. That is to say, as described later, when the coil segments 23 are rolled to give a hollow cylindrical body, these are bent from the inner (outer) peripheral side of the hollow cylindrical body towards the outer (inner) peripheral side. Moreover, at one end portion of the opposite end portions of the respective turns 29 which are located in the direction of the other diagonal A2 which is orthogonal to the direction of the one diagonal A1, the bent back portions 37 are wound from the inner peripheral side of the hollow cylindrical body to the outer peripheral side, and at the other end portion of the opposite end portions of the respective turns 29, are wound from the outer peripheral side to the inner peripheral side.

By forming the bent back portions 37 in this way, two sides 39 of one set are arranged so as to be on a lower side with respect to two sides 41 of the other set. That is to say, when the coil segment 23 is rolled into a hollow cylindrical body, then of the four sides of the approximately rhombic shaped coil segments 23, the two sides 39 located on one side of the other diagonal A2 are arranged at the outer peripheral side of the hollow cylindrical body, and the other two sides 41 facing the two sides 39 located on the one side, are arranged on the inner peripheral side of the hollow cylindrical body.

Figure 6:
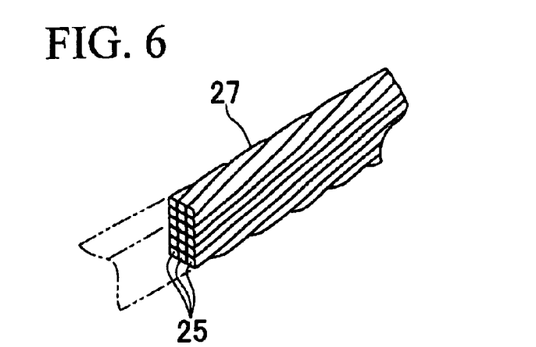
FIG. 6 is an enlarged perspective view showing a wire sheaf which forms the coil segment.

The coil segment 23, is formed from a continuous wire sheaf 27, by continuously winding a plurality of turns 29 (refer to FIG. 4 and FIG. 6). Consequently, a pair of terminals 31 for electrical connection are provided for each coil segment 23.

In FIG. 4 is shown a coil segment where the turns 29 are wound as 12.5 turns. However the number of windings is not limited to this and may be appropriately changed in accordance with the intended use.

As described above, the wire sheaf 27 is constructed with a plurality of magnetic wires 25 bundled together, and as will be apparent from FIG. 6, this wire sheaf 27 has a rectangular shape in cross-section. Furthermore, the wire sheaf 27 is twisted in helical form. With this twisting, it is desirable to apply at least one twist, that is at least 360°, within the range of one side of the rhombic shaped turn 29.

Figure 7:
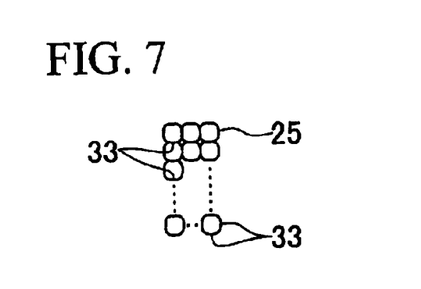
FIG. 7 is a cross-sectional view showing a cross-sectional shape of fine wires which make up the wire sheaf.

As shown in FIG. 7, each of the magnetic wires 25 constituting the wire sheaf 27 is made in a distorted circular cross-sectional shape. More specifically, these are an approximately square shape having linear portions 33 and bearing rounded corners. Since the magnetic wires 25 have this cross-sectional shape, then at the respective linear portions 33, the adjacent magnet wires 25 are contacted in a close contact condition.

Figure 9:
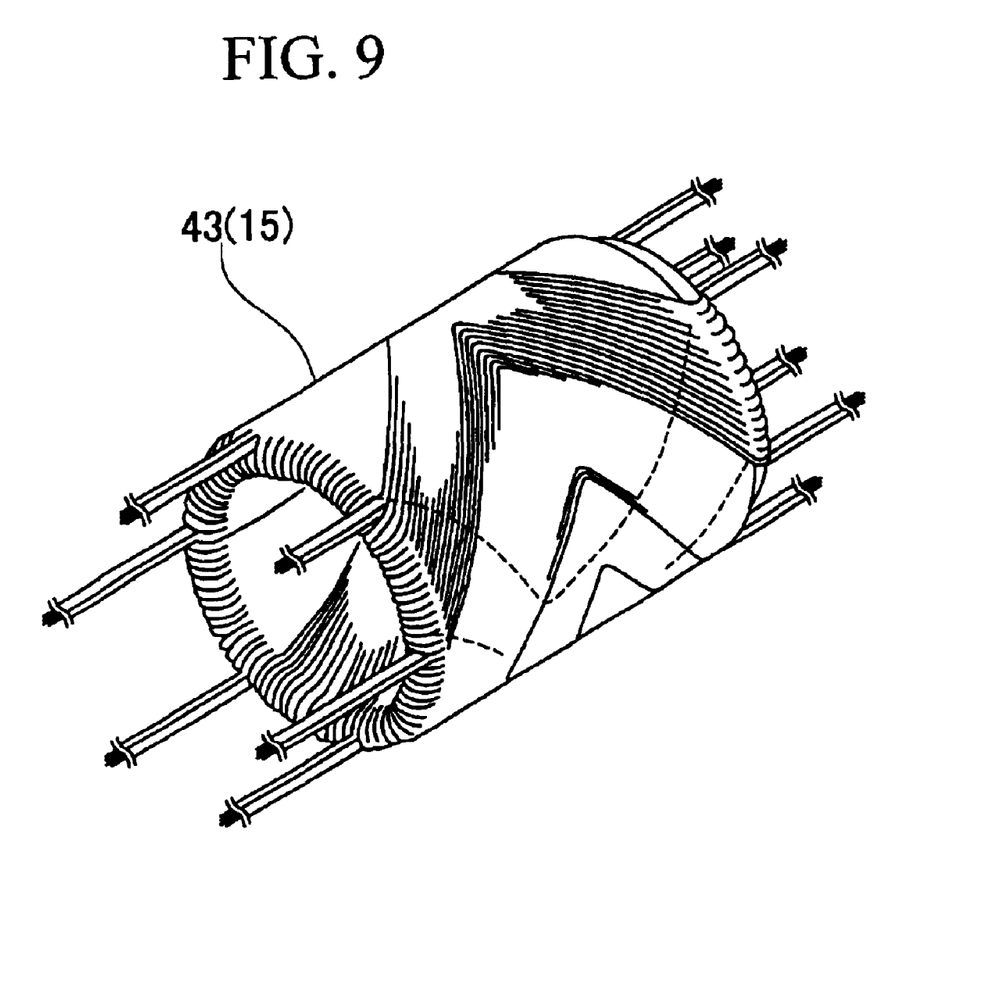
FIG. 9 is a perspective view showing a stator winding according to the present invention in the form of a hollow cylindrical body.

By using a plurality of coil segments 23 constructed as described above, a band shape body as shown in FIG. 3 is formed. This band shape body is then rolled into a cylindrical shape as shown in FIG. 9 to give a hollow cylindrical body 43.

Figure 8:
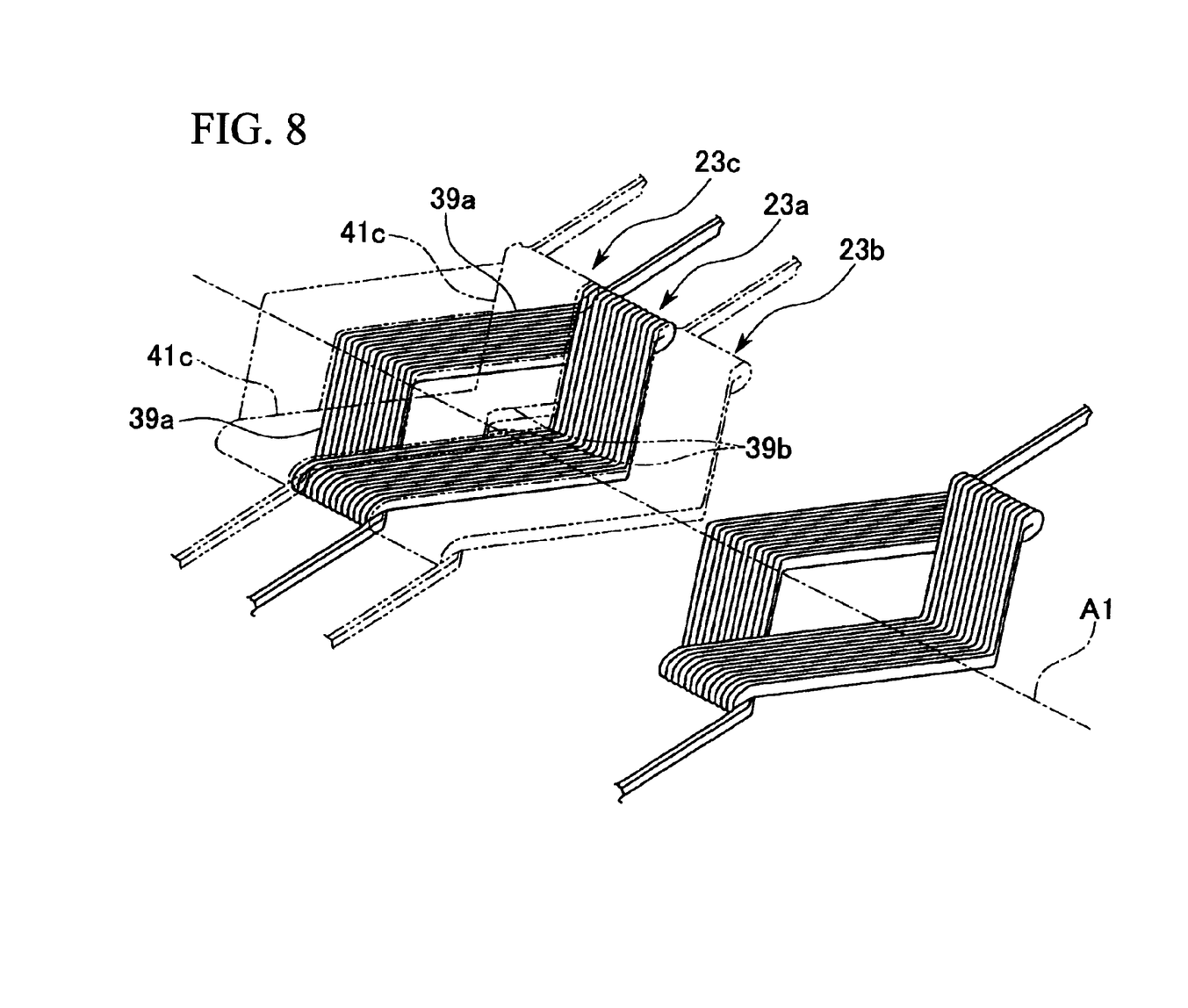
FIG. 8 is a perspective view showing an arrangement condition of the coil segments.

Each coil segment 23 is overlapped as follows. That is to say, each coil segment 23, as shown in FIG. 8 is arranged sequentially shifted while being overlapped in the direction of the one diagonal A1. More precisely, two sides 39a of the coil segment 23a arranged at the bottom side (left side) in the figure are arranged adjacent in the direction of the one diagonal A1 to two sides 39b arranged at the bottom side (left side) in the figure of the adjacent coil segment 23b. Furthermore, these are arranged so as to overlap in the vertical direction or in the direction of the other diagonal, the two sides 41c located at the upper side in the figure, of the adjacent coil segment 23c. By arranging in this manner, when the coil segments 23 are formed into a hollow cylindrical shape, the two sides 39 of the coil segments 23, which are arranged on the outer peripheral side of the cylindrical body are abutted in the circumferential direction against the two sides 39 which are arranged on the outer peripheral side of the adjacent coil segments 23, and are arranged so as to radially overlap the two sides 41 of the adjacent coil segments 23, which are arranged on the inner peripheral side of the cylindrical body.

Figure 10:
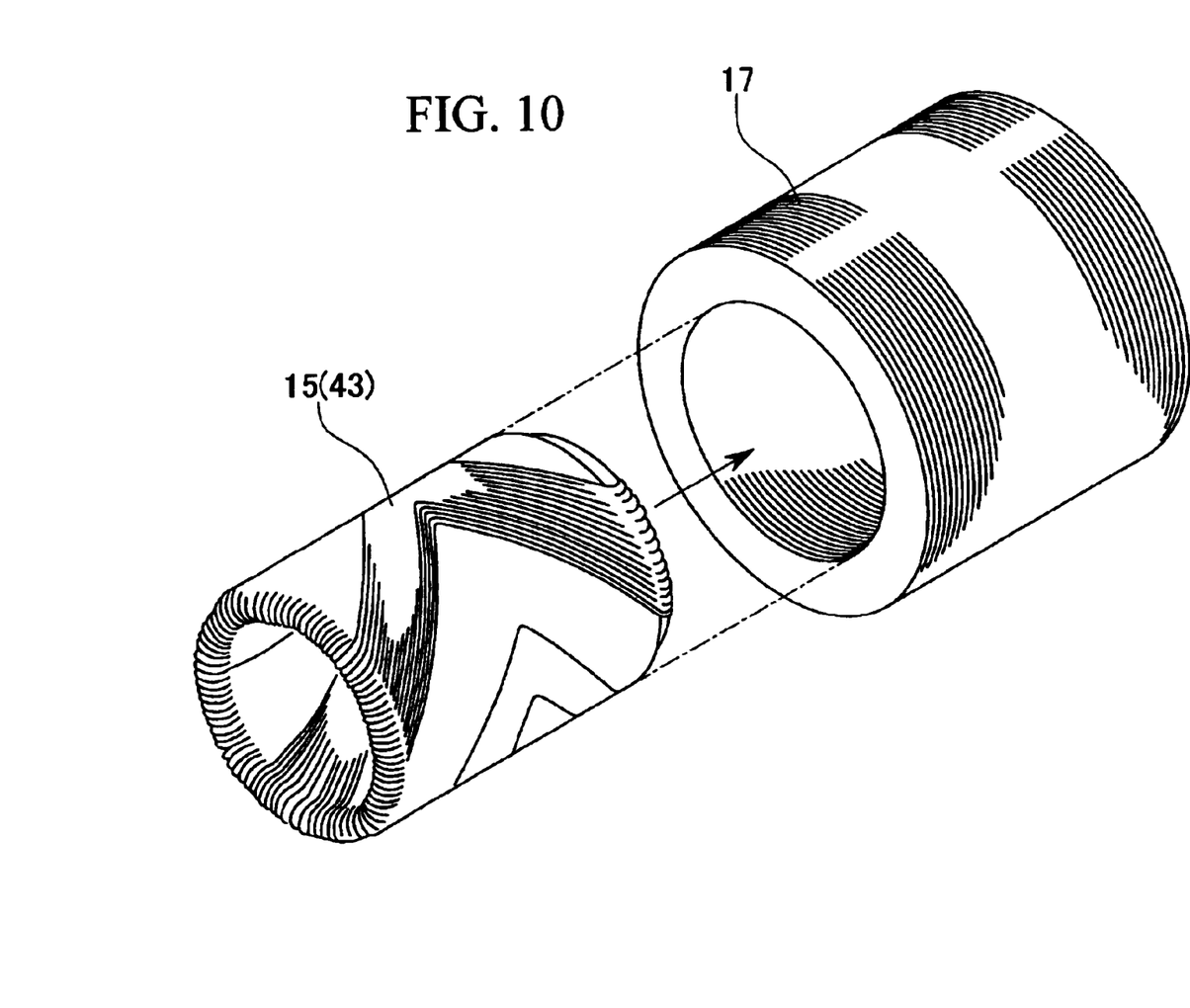
FIG. 10 is a perspective view showing a condition where the stator winding is inserted into a stator core.

The winding 15 made as the cylindrical hollow body 43 (refer to FIG. 9) comprising the plurality of coil segments 23 constructed in the above manner, is inserted inside the stator core 17 as shown in FIG. 10 and secured.

Hereunder is a description of the method of manufacturing the winding 15.

At first, the plurality of magnetic wires 25 are bundled together to form the wire sheaf 27 (refer to FIG. 6). The wire sheaf 27 is then wound in an approximately rhombic shape to form a plurality of turns (refer to FIG. 4).

At this time, the wire sheaf 27 is wound so as to form the aforementioned bent back portions 37.

Preferably at the time of forming the turns 29, it is desirable that the wire sheaf 27 is pressed with a press so that the adjacent magnetic wires 25 are closely packed together. Moreover, as shown in FIG. 7, it is desirable to form the wire sheaf 27 with a press so as to have a rectangular shape in cross-section.

More preferably, before pressing, it is desirable that the wire sheaves 27 are twisted at least once within the range of one side of the approximately rhombic shaped turns 29.

Next, a coil segment 23 comprising a continuous length of the wire sheaf 27 is formed by arranging a plurality of the respective turns 29 so as to be sequentially shifted in the direction of the one diagonal A1 (refer to FIG. 4).

After this, the hollow cylindrical body 43 (refer to FIG. 9) is formed by forming the band shaped body (refer to FIG. 8) using a plurality of the coil segments 23 with these coil segments 23 sequentially shifted and overlapped in the direction of the one diagonal A1, and then rolling the band shaped body into a cylindrical shape.

In the above manner, the winding 15 is formed.

With the winding 15 according to this embodiment, the following characteristic effects can be demonstrated.

The bent back portions 37 are provided in the winding 15, and these bent back portions 37 are bent in a U-shape in the longitudinal direction of the hollow cylindrical body 43 to give the hair pin shape, and become the end portions of the hollow cylindrical body 43. Therefore, compared to the conventional winding where the winding which is exposed from the stator core extends in the circumferential direction, the amount of magnetic wire 25 which is used can be considerably reduced. Since, in this way, the overall length of the magnetic wires 25 is shortened, the direct current resistance of the winding 15 can be reduced, and hence heating of the winding 15 due to joule heating can be suppressed.

Since the bent back portions 37 are bent from the inner (outer) peripheral side of the hollow cylindrical body 43 to the outer (inner) peripheral side, the respective turns 29 can be more tightly arranged. That is to say, since the bent back portions 37 are bent in the radial direction of the hollow cylindrical body 43, these bent back portions 37 can be arranged in close contact in the circumferential direction. As a result, the respective turns 29 also can be closely arranged in the circumferential direction, and even if the number of turns increases, there is no overlapping of the wire sheaves 27 in the radial or axial directions. Since the wire sheaves 27 are not overlapped in the axial direction of the hollow cylindrical body 43, then for example even if the number of turns is increased, the overall length of the winding 15 and consequently the overall length of the rotating electrical machine is not increased. Consequently, a high output due to increasing the amount of conductors can be realized, together with miniaturization of the rotating electrical machine.

Moreover, by bending from the inner peripheral side to the outer peripheral side, the one set of two sides 39 can be arranged on the outer peripheral side, and the other set of two sides 41 can be arranged on the inner peripheral side. Consequently, the wire sheaves 27 can be arranged evenly and close together on both the inner peripheral side and the outer peripheral side of the hollow cylindrical body.

The construction is such that the two sides 39 of the one coil segment 23, on the outer peripheral side are positioned side by side in the circumferential direction relative to the two sides 39 of the other coil segment 23, on the outer peripheral side, and these are positioned abutting in the radial direction against the two sides 41 on the inner peripheral side of the other coil segment 23. Therefore, the wire sheaves can be arranged evenly and close together in the circumferential and radial directions. Consequently, a sufficiently high current density can be maintained, and a high output thus achieved.

Since the cross-sectional shape of the wire sheaf 27 is an approximate rectangular shape due to pressing, when the plurality of wire sheaves 27 are arranged in a line, these can be arranged so as to have no gap, rather than with the case where a wire sheaf with strands of simple circular cross-section are bundled together. That is, the conductor space factor per one side of the coil segment 23 can be increased.

Since the cross-sectional shape of the magnetic wires 25 is made a distorted circular shape such that adjacent magnetic wires 25 are closely contacted at the linear portions 33, the conductors can be more densely arranged inside the wire sheaf 27 than with the construction where magnet wires having a circular cross-section is simply bundled together. Hence a higher current density can be obtained.

Since the wire sheaf 27 is made by twisting in a helical shape, an effect the same as conductor reversal in a Litz wire is obtained. In particular this occurs when the rotor 7 of the rotating electrical machine 3 is rotated at high speed. Hence eddy current losses and circulating current losses can be significantly reduced.

Furthermore, by adopting the construction with the helical shape twist, the situation where the wire sheaf 27 becomes loose and out of place, can be avoided.

In particular, in the case of a manufacturing method where, after twisting the wire sheaf 27, this is pressed while applying heat to the wire, the magnetic wires 25 are formed in a twisted condition, and hence the bonding together of the respective magnetic wires 25 is increased more than by simply pressing Therefore the wire sheaf 27 can be reliably formed. Consequently, when later forming the turns 29, the cross-sectional shape of the rectangularly formed wire sheaf 27 can be stably maintained without unraveling. Furthermore, there is no longer the need as heretofore at the time of winding and forming the winding to make this rigid by impregnating a resin such as varnish into the magnetic wires 25 and using self bonding wires. Therefore heat dissipation is not impaired by the resin, and a reduction in space factor of the conductors occurring as a result of the resin penetrating into between the magnet wires 25 does not result.

Figure 12:
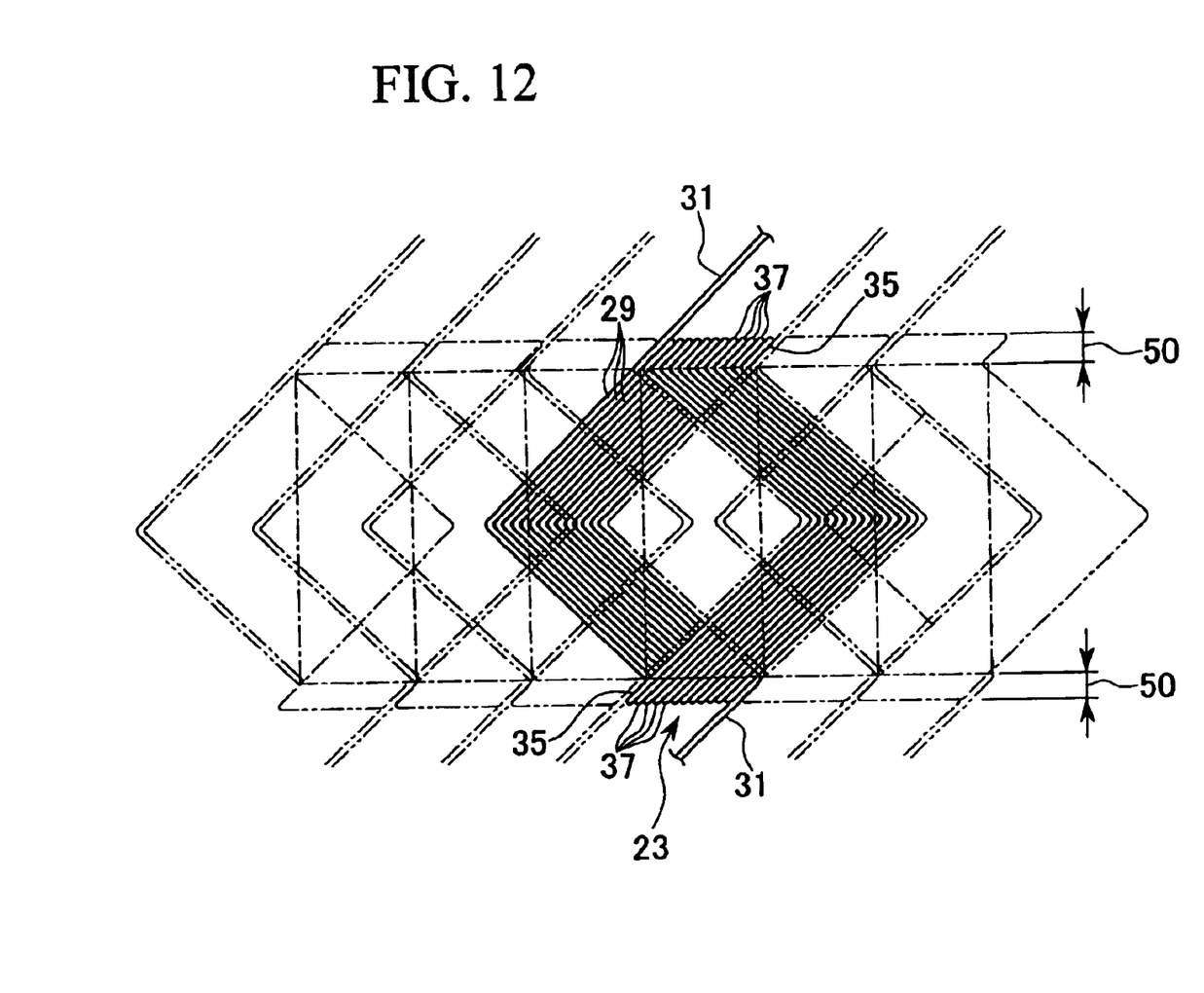
FIG. 12 is a plan view showing a modified example of extended portions of turns.

Here with the abovementioned embodiment, the description has been for a construction having an extended portion 50 where the bent back portions 37 proceed along the other diagonal A2 towards the outside of the turns 29 and then return back in an approximate U-shape and proceed along the other diagonal A2 in the direction towards the inside of the turns 29 (refer to FIG. 4). However even if this extended portion 50, as shown in FIG. 12 is constructed so as to be located on an extension in the extension direction of either side of the two sides containing the bent back portions 37, of the four sides of the approximate rhombic shape turns 29, the above effect is not impaired. Furthermore, a construction having simply a bent back end portion with the extended portion 50 omitted is also possible.

As described above, with the present invention, since the bent back portions are provided at opposite ends of the respective turns, the respective turns can be tightly wound. As a result, a high current value can be realized, and a high output from the rotating electrical machine can be achieved.

Furthermore, since the bent back portions can be arranged sequentially aligned in the circumferential direction, a size increase in the axial direction and the diametral direction due to an increase in the amount of conductors can be avoided. Hence miniaturization of the rotating electrical machine can be realized.

Since the construction is such that the wire sheaf is twisted in a helical shape, eddy current losses and circulating current losses produced at the time of high speed rotation of the rotating electric machine can be considerably reduced. Moreover this can also cope with increased speeds.

By adopting the method of manufacturing the wire sheaf by pressing, the cross-sectional shape of the wire sheaf can be stably maintained. Therefore the degree of freedom at the time of winding manufacture can be considerably increased.

Although there have been described what are at present considered to be the preferred embodiments of the invention, it will be understood that variations and modifications may be made thereto without departing from the gist or essence of the invention. The scope of the invention is indicated by the appended claims.

What is claimed is:

1. A stator winding for use in a rotating electric machine having a slotless stator, said stator winding being a hollow cylindrical body formed by:

forming turns by winding a wire sheaf of a plurality of fine wires composed of conductors bundled together, though one turn in an approximately rhombic shape;

forming approximately rhombic shaped coil segments comprising a continuous length of said wire sheaf by winding and arranging a plurality of said turns so as to be sequentially shifted continuously in a direction of one diagonal of said rhombic shape;

forming a band shape body using a plurality of said coil segments with these coil segments sequentially shifted in the direction of said one diagonal and so as to be adjacent to each other; and rolling said band shaped body into a hollow cylindrical shape;

wherein with each of said respective turns, opposite end portions which are located in a direction of another diagonal of said rhombic shape orthogonal to the direction of said one diagonal, have bent back portions which are disposed outside of said rhombic shape;

said bent back portions become end portions of said hollow cylindrical body; and said bent back portions are bent to an inner peripheral side of said hollow cylindrical body.

2. A stator winding according to claim 1, wherein with said wire sheaf, one end portion of said opposite end portions of said respective turns which are located in said direction of another diagonal of said rhombic shape orthogonal to the direction of said one diagonal is wound from the inner peripheral side of said hollow cylindrical body to an outer peripheral side thereof, and another and portion of said opposite end portions of said respective turns, is wound from the outer peripheral side of said hollow cylindrical body to the inner peripheral side thereof.

3. A stator winding according to claim 2, wherein said bent back portions proceed so as to project outside of said turn, and then return back in an approximately U-shape and proceed so as to return inside of side turn.

4. A stator winding according to claim 2, wherein of the four sides of said approximately rhombic shaped coil segments, two said sides located on one side of said other diagonal of said rhombic shape are arranged on the inner peripheral side of said hollow cylindrical body, and the other two said sides opposite to the two said sides located on said one side are arranged on an outer peripheral side of said hollow cylindrical body.

5. A stator winding according to claim 4, wherein the two sides of the coil segment which are arranged on the inner peripheral side of said hollow cylindrical body are abutted in the circumferential direction against said two sides which are arranged on the inner peripheral side of the coil segment adjacent thereto.

6. A stator winding according to claim 1, wherein said bent back portions proceed so as to project outside of said turn, then return back in an approximately U-shaped and proceed so as to return inside of said turn.

7. A stator winding according to claim 6, wherein said bent back portions are bent from the outer peripheral side of said hollow cylindrical body towards the inner peripheral side thereof.

8. A stator winding according to claim 6, wherein of the four sides of said approximately rhombic shaped coil segments, two said sides located on one side of said other diagonal of said rhombic shape are arranged on the inner peripheral side of mid hollow cylindrical body, and the other two said sides opposite to the two said sides located on said one side are arranged on an outer peripheral side of said hollow cylindrical body.

9. A stator winding according to claim 1, wherein said wire sheaf has an approximately rectangular shaped cross-section.

10. A stator winding according to claim 1, wherein said fine wires have a distorted circular cross-section with linear portions, and adjacent fine wires are contacted together at said linear portions.

11. A stator winding according to claim 1, wherein said respective turns are arranged touching adjacent ones of said turns.

12. A stator winding according to claim 1, wherein outer peripheral sides of the sequentially adjacent coil segments radially overlap inner peripheral sides of the adjacent coil segments in the hollow cylindrical shape.

13. A stator winding according to claim 1, wherein each said coil segment is sequentially shifted such that portions of multiple turns of said coil overlap with portions of multiple turns an adjacent one of said coil segments.

14. A stator winding according to claim 1, wherein each said turn is wound in the same manner.

15. A stator winding for use in a rotating electric machine having a slotless stator, said stator winding being a hollow cylindrical body formed by:

forming turns by winding a wire sheaf of a plurality of fine wires composed of conductors bundled together, though one turn in an approximately rhombic shape;

forming approximately rhombic shaped coil segments comprising a continuous length of said wire sheaf by winding and arranging a plurality of said turns so as to be sequentially shifted continuously in a direction of one diagonal of said rhombic shape;

forming a band shaped body using a plurality of said coil segments with these coil segments sequentially shifted in the direction of said one diagonal and so as to be adjacent to each other; and rolling said band shaped body into a hollow cylindrical shape;

wherein said wire sheaf is twisted at least one turn in a helical form within a range of one side of the respective approximate rhombic shaped turns.

16. A stator winding for use in a rotating electric machine having a slotless stator, comprising a band shaped body of a plurality of coil segments rolled into a hollow cylindrical shape, wherein:

each of said coil segments is approximately rhombic shaped and includes a continuous length of a wire sheaf wound and arranged into a plurality of turns which are sequentially shifted continuously in a direction of one diagonal of said rhombic shape;

each of said turns is also approximately rhombic shaped;

said wire sheaf includes a plurality of fine wires composed of conductors bundled together;

said plurality of said coil segments of said band shaped body are sequentially shifted in the direction of said one diagonal and so as to be adjacent to each other; and with each of said respective turns, opposite end portions which are located in a direction of another diagonal of said rhombic shape orthogonal to the direction of said one diagonal, have bent back portions which are disposed outside of said rhombic shape;

said bent back potions become end portions of said hollow cylindrical body; and said bent back portions are bent to an inner peripheral side of said hollow cylindrical body.

17. A stator winding according to claim 16, wherein with said wire sheaf, one end portion of said opposite end portions of respective ones of said turns which are located in said direction of another diagonal of said rhombic shape orthogonal to the direction of said one diagonal is wound from the inner peripheral side of said hollow cylindrical body to an outer peripheral side thereof, and another end portion of said opposite end portions of said respective turns, is wound from the outer peripheral side of said hollow cylindrical body to the inner peripheral side thereof.

18. A stator winding according to claim 16, wherein said bent back portions proceed so as to project outside of said turn, and then return back in an approximately U-shape and proceed so as to return inside of said turn.

19. A stator winding according to claim 16, wherein outer peripheral sides of the sequentially adjacent coil segments radially overlap inner peripheral sides of the adjacent coil segments in the hollow cylindrical shape.

\* \* \* \* \*

UNITED STATES PATENT AND TRADEMARK OFFICE
CERTIFICATE OF CORRECTION

PATENT NO. : 6,791,224 B1
DATED : September 14, 2004
INVENTOR(S) : Ozawa et al.

It is certified that error appears in the above-identified patent and that said Letters Patent is hereby corrected as shown below:

Title page,
Item [57], ABSTRACT
Line 2, between "turization" and "formed by winding", insert -- includes --.

Column 2,
Line 2, at the beginning of the line, before "113, since apexes", insert -- coil --.
Line 27, between "approximately rhombic" and "forming approximately", change "shaped" to -- shape; --.
Line 28, between "rhombic" and "coil segments", change "shape" to -- shaped --.
Line 32, between "forming a band" and "body using a plurality", change "shape" to -- shaped --.
Line 34, between "rolling the band" and "body into a", change "shape" to -- shaped --.
Line 46, between "in the direction of" and "diagonal orthogonal" change "an other" to -- another --.
Lines 55-56, change "an other" at the end of line 54 and extending to line 55 to -- another --.

Column 3,
Line 3, between "direction of the" and "cylindrical", insert -- hollow --.
Line 9, between "and is only a little" and "Hence the" insert -- of the entire windings. --; and delete the comma.
Lines 10-11, delete "of the entire windings".

Column 4,
Line 4, after "for example", insert a comma;
Line 36, between "in the direction of" and "diagonal" change "an other" to -- another --.
Line 41, at the beginning of the line, change "an other" to -- another --.
Line 52, at the end of the line, before the period, change "turns" to -- turn --.

Figure 3:
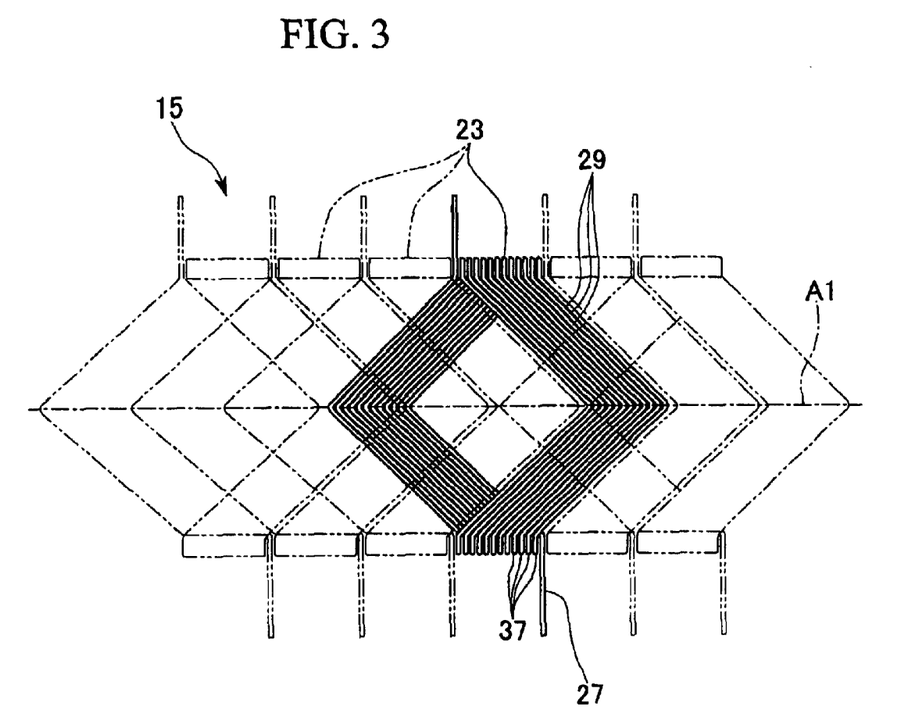
FIG. 3 is a plan view showing a condition where a hollow cylindrical body formed from a plurality of coil segments is developed into a plane.

Column 6,
Line between 28 & 29, after the line "Hereunder is a detailed description of the winding." replace the following paragraph, "Moreover, by bending from the inner peripheral side of the hollow cylindrical body to the outer peripheral side thereof, the one set of two sides 39 can be arranged on the outer peripheral side, and the other set of two sides 41 can be arranged on the inner peripheral side. Consequently, the wire sheaves 27 can be arranged evenly and close together on both the inner peripheral side and the outer peripheral side of the hollow cylindrical body." with the following paragraph, -- FIG. 3 shows a condition where the hollow cylindrical shaped stator winding15 has been developed into a plane. This band shaped winding 15 developed into a plane 20 comprises a plurality of coil segments 23. The coil segments 23, in the present embodiment correspond to a three phase two pole configuration, and hence there are 3 x 2 = 6 segments. That is to say, in the case where the rotating electrical machine is an m phase p pole configuration, then m x p coil segments are used --.

UNITED STATES PATENT AND TRADEMARK OFFICE
CERTIFICATE OF CORRECTION

PATENT NO. : 6,791,224 B1
DATED : September 14, 2004
INVENTOR(S) : Ozawa et al.

It is certified that error appears in the above-identified patent and that said Letters Patent is hereby corrected as shown below:

Column 6 (cont'd),
Line 49, after "direction in the figure", change the comma to a period.

Column 7,
Line 52, between "a band" and "body as shown in" change "shape" to -- shaped --.

Column 8,
Line 3, between "peripheral side of the" and "cylindrical", insert -- hollow --.
Line 9, between "of the" and "cylindrical body", insert -- of the hollow cylindrical body --.

Column 9,
Line 11, between "inner peripheral side" and "to", insert -- of the hollow cylindrical body --.
Line 12, after "outer peripheral side" and before the comma, insert -- thereof --.
Line 56, between "simply pressing" and "Therefore, the wire", insert a period.

Column 11,
Line 9, between "and another" and "portion of said" change "and" to -- end --.
Line 33, between "an approximately" and "and" change "U-shaped" to -- U-shape --.
Line 43, between "side of" and "hollow cylindrical body" change "mid" to -- said --.
Line 64, between "turns" and "an adjacent one" insert -- of --.

Signed and Sealed this

Eighth Day of February, 2005

JON W. DUDAS
*Director of the United States Patent and Trademark Office*